United States Patent [19]

Breen

[11] 4,255,774

[45] Mar. 10, 1981

[54] STATIC INSTANTANEOUS OVERCURRENT RELAY WITH LOW TRANSIENT OVERREACH

[75] Inventor: Thomas B. Breen, Lansdowne, Pa.

[73] Assignee: General Electric Company, Philadelphia, Pa.

[21] Appl. No.: 21,143

[22] Filed: Mar. 16, 1979

[51] Int. Cl.³ .................................... H02H 3/093
[52] U.S. Cl. ..................................... 361/95; 361/94; 361/110
[58] Field of Search ............... 361/95, 94, 96, 97, 361/110, 111, 92, 86, 87, 196; 307/293

[56] References Cited

U.S. PATENT DOCUMENTS

| 3,001,100 | 9/1961 | Schuh et al. | |
|---|---|---|---|
| 3,522,478 | 8/1970 | Reis | 361/94 |
| 3,836,790 | 9/1974 | Becker | 361/110 X |
| 3,883,782 | 5/1975 | Beckwith | 361/110 X |
| 3,944,889 | 3/1976 | Conway | 361/110 X |
| 4,152,744 | 5/1979 | Pang | 361/94 |

Primary Examiner—Patrick R. Salce
Attorney, Agent, or Firm—William Freedman; Carl L. Silverman; John P. McMahon

[57] ABSTRACT

A static instantaneous overcurrent relay with reduced transient overreach is provided for use in protecting an a-c power line from overcurrents. The relay operates on an input signal representative of the magnitude of the current in the a-c power line and develops a relay output signal when the magnitude of the current reaches a predetermined magnitude. In a preferred embodiment, the relay includes a level detector circuit for receiving the input signal which is in the form of a pulsating waveform having the same frequency as the a-c power line. The level detector circuit develops a discrete level detector output signal in response to each pulse of the waveform which attains a magnitude representative of the predetermined magnitude. Output circuit means is coupled to receive the discrete level detector output signals and includes temporary inhibit means for inhibiting the development of the relay output signal until the output circuit has received two of the discrete level detector signals. In one form of the invention, the temporary inhibit means includes delay circuit means for receiving the discrete level detector output signals and developing a delayed signal. AND circuit means is then provided to receive the discrete level detector output signals and the delayed signal, resulting in a relay output signal after two level detector output signals are present. In one form of the present invention, the relay has a transient overreach percentage of less than 8% for power line angles up to 75°. The relay of the present invention may be employed in connection with a single phase input signal as well as with a three phase input signal.

26 Claims, 4 Drawing Figures

STATIC INSTANTANEOUS OVERCURRENT RELAY WITH LOW TRANSIENT OVERREACH

BACKGROUND OF THE INVENTION

The present invention relates to an instantaneous overcurrent relay, and more particularly to a static instantaneous relay with low transient overreach.

As a result of advancements in solid state technology, static protective relays have been developed. Exemplary static relays are disclosed in U.S. Pat. No. 4,092,690, entitled, "Protective Relay Circuit Providing a Combined Distance and Overcurrent Function", issued May 30, 1978; and in U.S. Pat. No. 4,034,269, entitled, "Protective Relay Circuits", issued July 5, 1977.

An overcurrent protective relay is employed when it is necessary to trip a circuit breaker when greater than a predetermined magnitude of current flows into a particular portion of a power system. Such overcurrent relays are broadly characterized as "instantaneous" or "time delay", with "time delay" being further characterized as "inverse"; "very inverse"; or "extremely inverse". An instantaneous overcurrent relay is generally provided with no intentional time delay whereas a time delay overcurrent relay is provided with various degrees of time delay.

Instantaneous overcurrent relays have a tendency to overreach. Overreach is generally defined as the tendency of a relay to pick up, i.e., operate, for fault currents less than one would expect; that is, if the effect of offset in the fault current wave were neglected. Percent overreach is a term which describes the degree to which this transient tendency exists, and may be defined as follows:

Percent overreach = 100 (A−B)/A, where

A = relay pickup current, in steady state rms amperes.
B = the steady-state rms amperes which, when fully offset initially, will just pick up the relay.

As an example of the foregoing, consider an application involving electro-mechanical instantaneous overcurrent relays having a typical 15% transient overreach. For a fault with a steady state component of 10 amps, if the relay is not to operate for such a fault, the value A, i.e., the relay pick-up setting, must exceed:

(100×10)/(100−15) amperes = 11.8 amperes

However, referring now to the static instantaneous overcurrent relay, it is to be appreciated that such static relays operate much more quickly than the electromechanical instantaneous overcurrent relays. This is due in large measure to the fact that the electromechanical relays have a certain amount of inertia to overcome before operation whereas no such inertia must be overcome in a static relay. Accordingly, the transient overreach percentage for a static relay approaches the maximum value which is the value for a relay which is fast enough to respond to the instantaneous magnitude of the current. For example, in an exemplary power line having a line angle ($\theta$) of 75°, the maximum transient overreach percentage approaches 33%. This transient overreach percentage can be responded to with the technique discussed above in the case of the 15% electromechanical transient overreach percentage. However, in the case of the 33% transient overreach situation, this technique is undesirable as it requires the pickup of the relay to be set 50% greater than the steady state fault current. Such a setting would be contrary to good protective relaying engineering practices which generally require that the relay be set as close to the steady state load current as possible because this permits more complete coverage of the line under fault conditions.

One proposed technique to employ in connection with this greater transient overreach problem in static overcurrent relays is to delay the operation of the relay for a time period sufficient to reduce the transient overreach percentage to an acceptable level. However, this technique is undesirable because excessive delays would be injected to cover all conditions.

One application for a static instantaneous overcurrent relay is for protecting an electrical power distribution line. Such a distribution line may have a typical line angle ($\theta$), the angle between the system voltage and system current, of less than about 77°. It would be desirable to provide such a static instantaneous overcurrent relay having a transient overreach of less than 10% for line angles up to about 77°.

Accordingly, it is a general object of this invention to provide a static instantaneous overcurrent relay with low transient overreach.

It is another object of this invention to provide such a static instantaneous overcurrent relay having a transient overreach percentage of less than 8% for a protected line angle ($\theta$) up to 75°.

It is another object of this invention to provide such a static instantaneous overcurrent relay having a transient overreach percentage of less than 8% for a protected line angle up to 75° with a three phase input signal and only one measuring unit.

SUMMARY

In carrying out one form of my invention, I provide a static instantaneous overcurrent relay for use in protecting an a-c power line from overcurrents wherein the relay receives an input signal representative of the magnitude of the current in the a-c power line and develops a relay output signal when the magnitude of the current in the a-c power line reaches a predetermined magnitude. The relay includes level detector circuit means for receiving the input signal representative of the magnitude of current in the a-c power line with the input signal being in the form of a pulsating waveform having substantially the same frequency as the frequency of the a-c power line, the pulsating waveform comprising a plurality of discrete pulses. The level detector circuit means develops a discrete level detector output signal in response to each one of the discrete pulses of the pulsating waveform which attains a magnitude representative of the predetermined magnitude of the current in the a-c power line. Output circuit means is coupled to receive the discrete level detector output signals. The output circuit includes temporary inhibit means for temporarily inhibiting the development of the relay output signal until the output circuit has received at least two of the discrete level detector signals representative of the predetermined magnitude of current in the a-c power line.

BRIEF DESCRIPTION OF THE DRAWINGS

While the specification concludes with claims particularly pointing out and distinctly claiming that which is regarded as the present invention, the objects and advantages of this invention can be more readily ascertained from the following description of preferred embodiments, when read in conjunction with the accompanying drawings, in which:

BRIEF DESCRIPTION OF THE INVENTION

Figure 1:
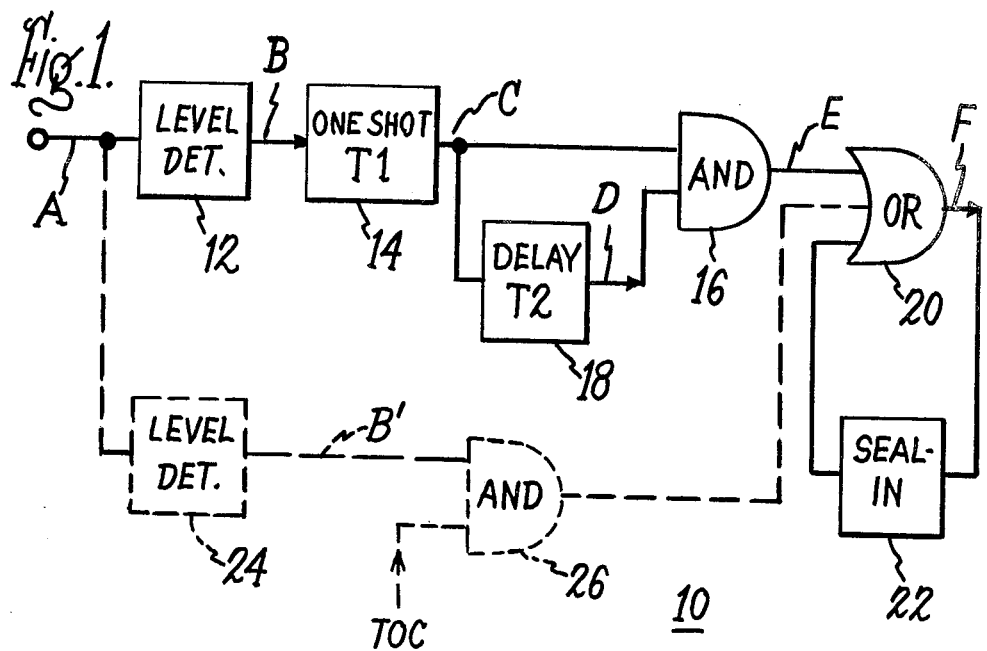
FIG. 1 is a functional block diagram of one form of static instantaneous overcurrent relay of the present invention.
Figure 2:
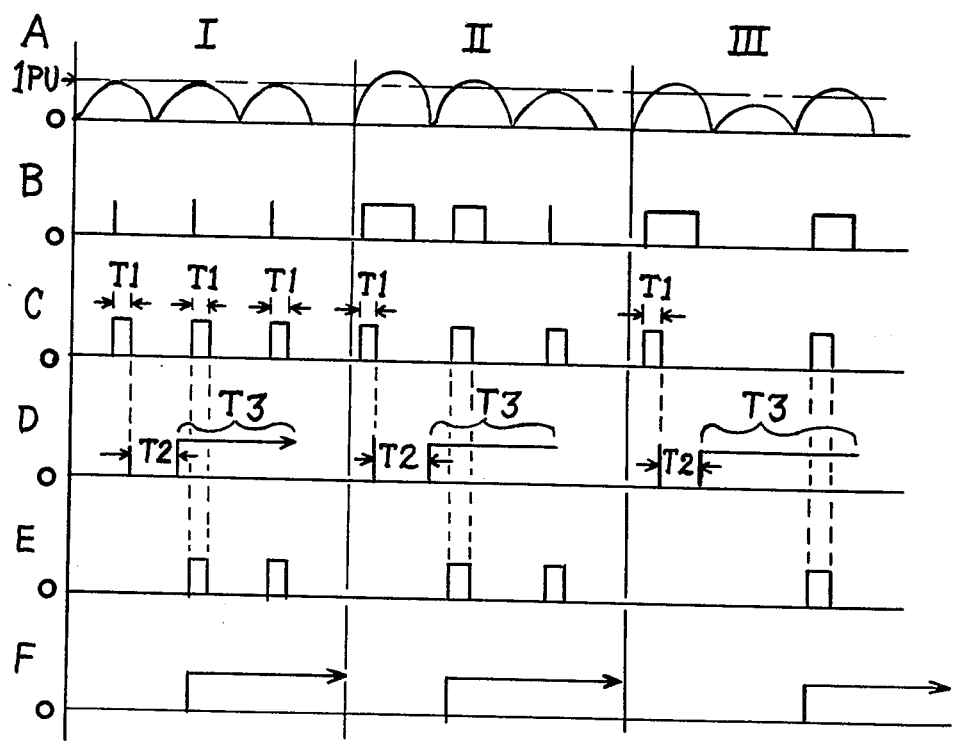
FIGS. 2A-2F are representations of exemplary wave forms associated with the block diagram of FIG. 1. Vertical classifications I, II, III represent three fault conditions.

Referring initially to FIGS. 1 and 2, one form of static instantaneous overcurrent relay of the present invention is generally designated 10. The portion of the circuit 10 shown in dashed lines in FIG. 1 will be discussed later. For purposes of clarity, FIGS. 2A-2F are vertically classified I, II, III. Unless otherwise specified, reference simply to FIGS. 2A-2F represents the vertical classification I.

The relay circuit 10 includes a level detector 12 for receiving an input signal A. In one form of the present invention, the input signal A is representative of the absolute value of current in the protected a-c power line (not shown). Typically, a current transformer is coupled to the protected line (not shown). Preferably, the input signal A is in the form of a full wave rectified signal, as shown in FIG. 2A. The level detector 12 functions to develop a pulse signal output B shown in FIG. 2B, whenever the input signal A is equal to or greater than a predetermined magnitude. This predetermined magnitude is set to represent the desired pickup level and is shown in FIG. 2A as 1 pu.

The output signal B of the level detector 12 is coupled to intermediate signal processing means 14 which functions to fix the time duration of the pulse signal B of FIG. 2B for a predetermined time period T1 following the initiation of the pulse signal B. The predetermined time period T1 is shown in FIG. 2C. In view of its operation, the intermediate signal processing means 14 may be conveniently referred to as a multivibrator, or, as a "one shot device". The output signal $\overline{C}$ of the one shot device 14 is coupled directly to AND circuit 16 and also coupled to AND circuit 16 through delay circuit 18. The delay circuit 18 receives the output signal C, and when signal C goes to zero, after predetermined time period T1, delay circuit 18 develops a delayed signal D. Delayed signal D is developed after a predetermined delay period T2, e.g., 1 ms. The duration of delayed signal D, hereinafter T3, is independent of signal input A. Typically, the duration T3 of delayed signal D is at least about 1 cycle or 20 ms, with about 25 ms being preferable. AND circuit 16 thus receives signals C and D and develops an output signal E, shown in FIG. 2E, during coincidence of signals C and D.

In FIG. 1, output signal E is shown directed to OR circuit 20 along with several other inputs which will be discussed later. The output of OR circuit 20 is output signal F, representing the output signal of the relay circuit 10. In order to employ this output signal F to trip a relay, seal-in means 22 are provided. The function of seal-in means 22 is merely to extend the duration of pulse signal E which is typically of about a millisecond in duration into the output signal F which is typically of about 20 ms. This 20 ms signal is generally sufficient to trip a coil.

The predetermined time periods of T1, T2, and T3 are preferably chosen such that the output signal E of FIG. 2E is developed on the second peak of the input signal A which is greater than or equal to the pick up value of 1 pu. This causes the relay output signal F to be developed on the second peak of the input signal A which is greater than or equal to 1 pu and results in relay pick-up on such second peak. To accomplish this second peak pick up in a typical 50 or 60 cycle power system, T1, T2, and T3 are typically related as follows: T1+T2<8 ms, T3≧20 ms. In a preferred static instantaneous overcurrent relay of the present invention, for a 50-60 Hz power system, T1 is from about 1 to about 7 ms, T2 is about 0.5 ms, and T3 is about 25 ms.

In the vertical classification I of FIGS. 2A-2F previously referred to, the three consecutive peaks of the input signal A were of the same value, this value being the pick up value. Referring now to vertical classification II of FIGS. 2A-2F, note that in this case, the first two peaks of input signal A exceed the pick up value 1 pu for a greater time period than the third peak. As in classification I, the output signal E of FIG. 2E is developed at the second peak of input signal A which reaches the pick up value.

Referring now to classification III of FIGS. 2A-2F, here the input signal A is shown with a first peak greater than the pick up value, a second peak less than the pick up value, and a third peak greater than the pick up value. In this case, the level detector 12 develops its output signal B only for the first and third peaks, as shown in FIG. 2B. The intermediate signal processing means 14 (one shot device) thus develops its output signal C only in connection with the first and third peaks. The delay circuit 18 develops its output signal D at time T2 following the first shot output signal C. The output signals C and D are coupled to the AND circuit 16 which produces its output signal E when output signal C and D are coincident. In this case, such coincidence occurs at the second peak of input signal A which is greater than or equal to the pick up value. Note, however, that the second peak of A which is of pick up value is actually separated from the first peak of pick up value by a second peak of A which is less than pick up value.

The advantage of the above described second peak operation of the relay circuit 10 of FIG. 1 may be better appreciated by considering the following expression, representing the fault current I in the protected line:

$$(1) \quad I = (E/Z)[\sin(wt - \lambda - \theta) - e^{-wt/\tan\theta} \sin(\lambda - \theta)]$$

where
E = power system voltage
Z = power system impedance
$\lambda$ = angle of the voltage at fault initiation
$\theta$ = characteristic angle between system voltage and system current
t = time
w = $2\pi f$; f being frequency
Expression (1) may be viewed as comprising a steady state portion:
(2) $\sin(wt - \lambda - \theta)$, and a transient portion:

(3) $-e^{-wt/\tan\theta} \sin(\lambda - \theta)$.

Note that the transient portion of expression (3) approaches a zero value when t approaches infinity and approaches a maximum value when $\theta = 90°$ and $\lambda = 0°$. This corresponds to the maximum transient overreach of 50% for a relay fast enough to respond to the instantaneous magnitude of the current in the protected line. The worst case, or maximum transient value, is therefore found at $\lambda = 0°$. Accordingly, the following expression represents the worst case transient form of expression (1), with E/Z being normalized to 1:

(4) $I = \sin(wt - \theta) - e^{-wt/\tan\theta} \sin(-\theta)$, with t=0 at fault initiation.

Figure 3:
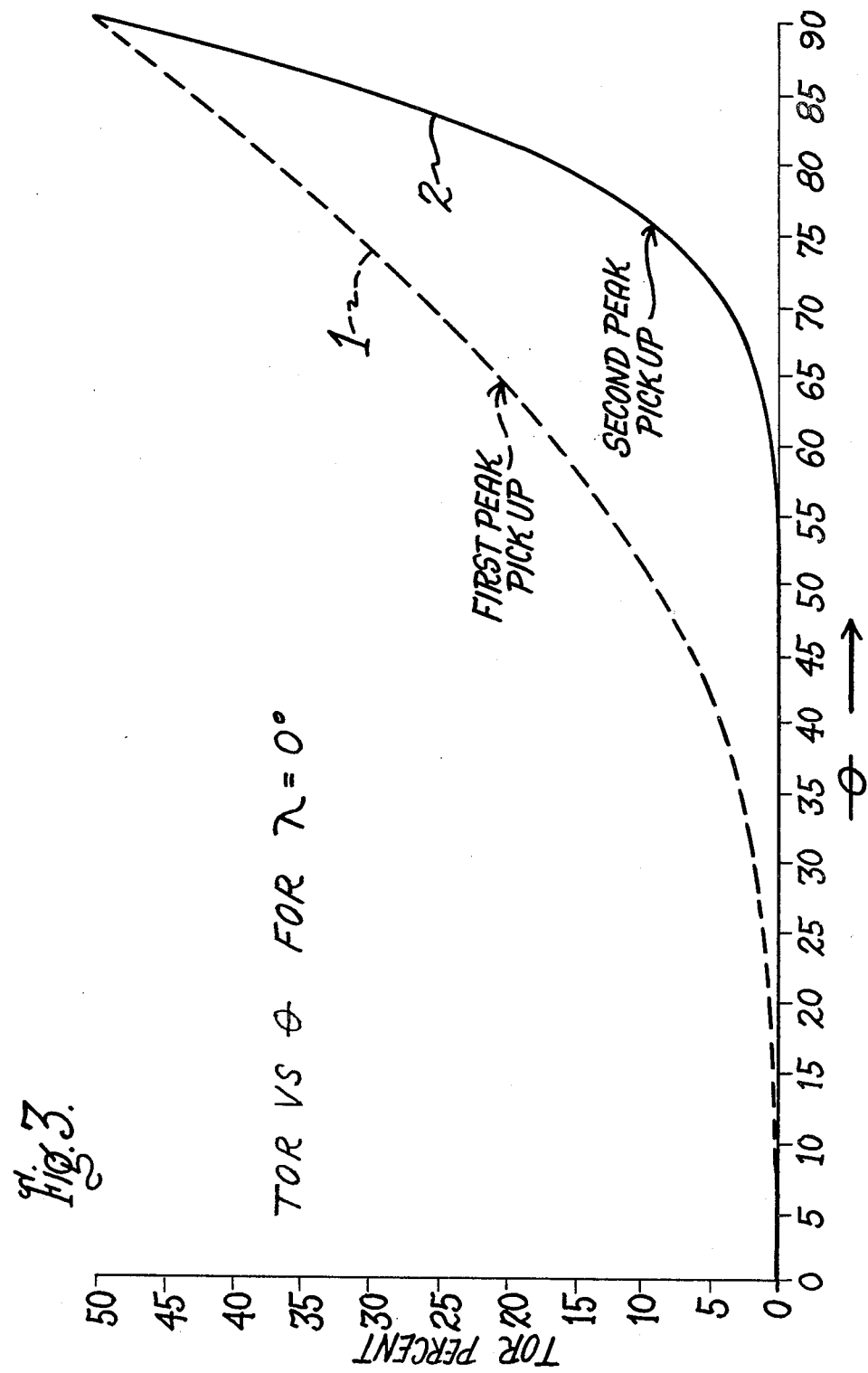
FIG. 3 is a plot of the transient overreach percentage (TOR) in two forms of static instantaneous overcurrent relay as a function of the line angle ($\theta$). Curve 1 represents a static instantaneous overcurrent relay which operates on the instantaneous current greater than or equal to the pickup level. Curve 2 represents a static instantaneous overcurrent relay of the present invention which operates on the second current peak greater than or equal to pickup level.

Referring now to FIG. 3, expression (4) is solved for various line angles $\theta$. The percent transient overreach (TOR) is then calculated at each of these line angles $\theta$. More particularly, the dashed line, curve 1, in FIG. 3 represents the transient overreach percent (TOR) as a function of line angle $\theta$ when expression 4 is solved for a time t equal to the first peak greater than or equal to the pickup value, which has been taken as 1. Curve 2, the solid line, represents the transient over-reach percent (TOR) as a function of line angle $\theta$ when expression 4 is solved for a time t equal to the second peak greater than or equal to the pick up value, again taken at 1. Thus, it can be observed that curve 1 represents a static instantaneous over-current relay with a generally undesirably high transient overreach percentage while curve 2 represents one form of static instantaneous overcurrent relay of the present invention having a reduced transient over-reach percentage.

Referring now to a typical power distribution circuit, where the line angle $\theta$ is typically between 55° and 75°, and $\lambda$ is typically between 0°-360°. Note in curve 2 (second peak pick up) that the worst case of transient overreach percentage (at $\lambda = 0°$) is less than 8% while the instantaneous overcurrent relay shown in curve 1 (first peak pick up) has a transient overreach percentage over this same line angle range as great as 31%. It is to be appreciated that other incident angles $\lambda$ from 0°-360° will have a transient overreach percentage even lower than that shown in curve 2. It is to be further appreciated that the curve 2 depiction of the operation of one form of static instantaneous overcurrent relay of the present invention is quite similar to the type of transient overreach curve exhibited by electromechanical relays having the previously mentioned built-in inertial delay.

Referring again to FIG. 1, the portion thereof shown in dashed lines will now be discussed. Input signal A is also coupled to a second level detector 24 which is similar to first level detector 12. Second level detector 24 is set to detect high level currents so as to provide a minimum trip time for high level faults. Typically, if the setting on the level detector 12 is normalized to 1 pu, the setting on high level detector 24 will be set at about 2.1 pu. The output signal of the high level detector 24 is similar to the output signal of the level detector 12. For this reason, the output signal of the level detector 24 is designated B'. The output signal B' may be coupled to OR circuit 20 through an AND circuit 26. The AND circuit 26 may include as a second input thereto a control or supervision signal, such as a supervision signal from a time overcurrent relay circuit. Such a control signal is simply designated TOC. Thus, the dashed line portions of FIG. 1 represent a bypass circuit means for providing reduced trip time for high level faults. It is to be appreciated that AND circuit 26 may be omitted wherein the high level detector output signal B' may be coupled directly to OR circuit 20. This latter configuration will still provide the above mentioned bypass operation for high level fault conditions.

Figure 4:
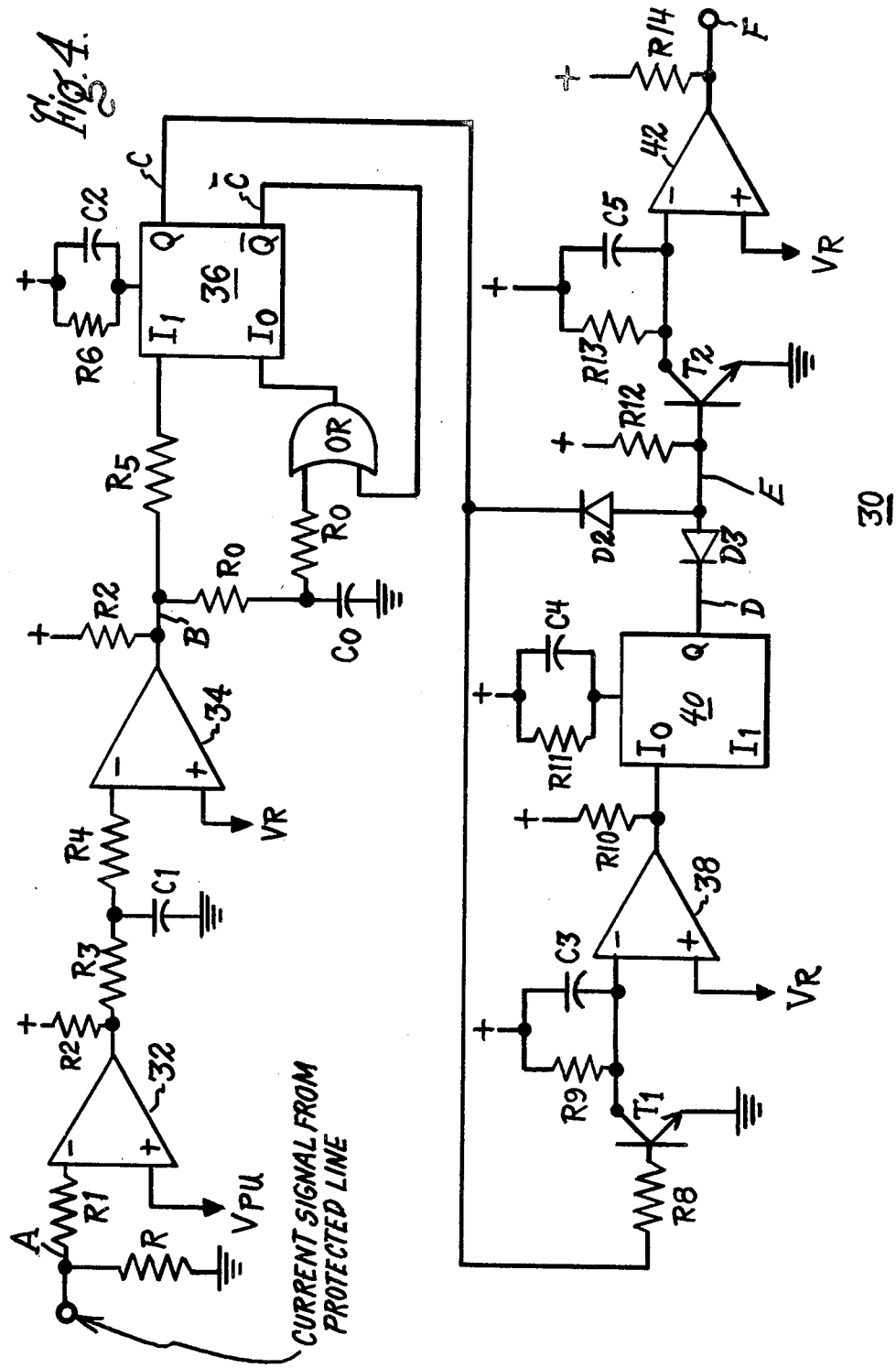
FIG. 4 is a circuit diagram of a portion of the instantaneous overcurrent relay shown in FIG. 1.

Referring now to FIG. 4, a circuit diagram, generally designated 30, of a portion of the static overcurrent relay 10 shown in FIG. 1 will now be discussed.

The circuit 30 includes a first resistor R to receive the current signal from the protected line (not shown) and to convert this signal into a voltage signal (input signal A). Resistor R1 couples this voltage signal to the inverting input of a voltage comparator 32, with a non-inverting input being coupled to a variable voltage source ($V_{pu}$) for setting the level of detection. The voltage comparator 32 functions as the first level detector 12 of FIG. 1. The output of voltage comparator 32 is coupled to a positive dc potential through pull-up resistor R2. The function of the positive potential and pull-up resistor R2 is to cause the level detector output signal to reach a value of about 15 V d.c. when the predetermined level ($V_{pu}$) is obtained. The output signal of voltage comparator 32 is filtered through an RC network comprising resistor R3 and capacitor C1. The now-filtered signal is further squared by coupling resistor R4 to the inverting input of a second voltage comparator 34. Voltage comparator 34 is set at a level less than the previously mentioned 15 volts d.c., e.g., $V_R$ about 5 volts d.c. The output of voltage comparator 34 is provided with a pull-up resistor, such as R2. The output signal of voltage comparator 34 represents the signal output B of FIGS. 1 and 2B.

The output signal B of voltage comparator 34 is coupled through resistor R5 to pulse processing means 36 (one shot device). The presence of output signal B at the input of one shot device 36 causes one shot device 36 to develop an output signal C which continues for a time period T1 determined by the RC network R6-C2. This time period T1 is shown in FIG. 2C. To ensure that the output signal C of the one shot device 36 is present only when the level detector signal B is present, another output signal $\overline{C}$ of one shot device 36 is coupled to a second input ($I_o$) of the one shot device through an OR device. This coupling may be in the form of the arrangement shown in FIG. 4 wherein resistors Ro, capacitor Co, and an OR device are employed. The output signal C of one shot device 36 is next divided into two branches, each of which is coupled through an AND gate which comprises diodes D2, D3. One branch of the output signal C of one shot device 36 is coupled directly through diode D2 while a second branch of the output signal C of one shot device 36 is coupled through resistor R8 into the base of transistor $T_1$. The collector of transistor $T_1$ is coupled to positive potential through an RC network comprising R9 and C3. RC network R9C3 provides the previously discussed time delay T2 (see FIG. 2D). The collector of transistor $T_1$ is further coupled to the inverting input of voltage comparator 38 which is set at a threshold level ($V_R$) of about 5 volts. The output of voltage comparator 38 is coupled through resistor R10 to a second one shot device 40. The one shot device 40 is similar to the one shot device 36. The one shot device 40 develops its output signal, which is actually signal output D of FIG. 1 and FIG. 2D. The time duration (T3) of output signal D is determined by RC network R11C4.

The delayed output signal D of the second one shot device 40 and the output signal C are coupled through AND gate D2, D3 to pull-up resistor R12 and the base of transistor $T_2$. The collector of transistor $T_2$ is coupled to positive potential through another RC network R13C5. The purpose of this RC network is to take the pulse signal (output signal E) appearing at the base of transistor $T_2$ and to convert it into a longer time period signal. Note that the presence of output signal E represents a condition where two peaks of input signal A have reached the pick-up value. More particularly, the pulse signal (output signal E) appearing at the base of transistor $T_2$ is generally ineffective in time duration to trip a relay coil, i.e., output signal E is typically about 1-7 ms. Accordingly, the RC network R13C5 is provided to extend the duration of the pulse signal for about T1+15 ms, i.e., a total time of about 20 ms. This extended duration signal appearing at the collector of transistor $T_2$ is coupled to voltage comparator 42 which is set at a level ($V_R$) of about 5 volts to provide a squaring effect to the trip signal. The output of voltage comparator 42 is coupled to positive potential through another pull up resistor R14, resulting in signal output F (see FIG. 2F). As mentioned previously, such pull up resistors assume that the output of each device so connected assumes one of two discrete levels.

Although the circuit 30 of FIG. 4 has been illustrated in connection with discrete devices, it is to be appreciated that commercially available integrated circuits may be conveniently employed to provide the functions depicted therein. In this connection, a single integrated circuit designated #239, commercially available from: Fairchild Camera & Instrument Corp., Mountain View, Ca.; National Semiconductor Corp., Santa Clara, Ca.; and Signetics Corp., Sunnyvale, Ca., may be employed to provide the four voltage comparators 32, 34, 38, 42. Similarly, a single integrated circuit designated #4538, commercially available from: Fairchild Camera & Instrument Corp.; Motorola Semiconductor Inc., Az.; and Solid State Scientific Inc., Pa., may be employed to provide the two "one shot" signal processing means 36, 40.

Although the present invention has been illustrated in connection with the processing of an input signal A, representative of the current in a single protected a-c power line, other embodiments are available. For example, input signal A may comprise a three phase input signal. In such an application, for 50-60 hertz, three phase operation, the time period T1 can be set at about 7 ms so as to discriminate between peaks such that the relay circuit would operate no sooner than the second peak in the same phase. Further, after the first peak of pick up level on one phase, this relay will operate on a second peak of pick up level from the other two phases. An advantage of this three phase embodiment is that only a single measuring unit, i.e., relay circuit, need be employed. Similarly, the present invention may be employed in other multi-phase applications.

Also, as previously indicated, the static instantaneous overcurrent relay of the present invention may include further signal processing means, such as additional supervision signals. Similarly, the output signal of the relay of the present invention may include further signal processing means such as inhibit means for temporarily inhibiting the development of the output signal for a predetermined time period. This temporary inhibition of the relay output signal (signal F of FIG. 1) may be desirable for system coordination purposes. Typically, this temporary inhibition is in the order of about 1 ms to about 1 sec.

It is to be appreciated that the reduced transient overreach percentage provided by the static instantaneous overcurrent relay of the present invention does not suffer from disadvantages associated with the previously mentioned technique of simply delaying the operation of the relay for a time period sufficient to reduce the transient overreach percentage to an acceptable level. For example, referring again to vertical classification III of FIGS. 2A-2F, note that, if a fixed delay time period of 10 ms were inserted after the first peak of pick up level, the relay would not operate properly because the second peak of pick up level in III occurs 20 ms later than the first peak of pick up level. Further, if, instead of 10 ms, a fixed delay time period of 20 ms were inserted, although the relay would now operate properly under the classification III fault condition, such a relay would have an operating time of no less than 20 ms. However, the static instantaneous overcurrent relay of the present invention provides proper operation for the fault condition in III with a minimum operating time of 10 ms, i.e., ½ cycle of source frequency.

While I have shown and described a particular embodiment of my invention, it will be obvious to those skilled in the art that various changes and modifications may be made without departing from the invention in its broader aspects; and I, therefore, intended in the appended claims to cover all such changes and modifications as fall within the true spirit and scope of my invention.

What I claim as new and desire to secure by Letters Patent of the United States is:

1. A static instantaneous overcurrent relay with reduced transient overreach for use in protecting an a-c power line from overcurrents wherein the relay receives an input signal representative of the magnitude of the current in the a-c power line and develops a relay output signal when the magnitude of the current in the a-c power line exceeds a predetermined limit, which comprises:
   (a) level detector circuit means for receiving the input signal representative of the magnitude of current in the a-c power line, said input signal being in the form of a pulsating waveform having substantially twice the frequency as the frequency of the a-c power line, said pulsating waveform comprising a plurality of discrete pulses, said level detector circuit means developing a discrete level detector output signal in response to each one of said discrete pulses of said pulsating waveform which attains a magnitude representative of a predetermined magnitude of the current in the a-c power line, and
   (b) output circuit means coupled to receive said discrete level detector output signals, said output circuit including a temporary inhibit means having means for establishing a first predetermined time duration T2 and a second predetermined time duration T3, said first predetermined time duration T2 commencing upon the occurrence of a first discrete level output signal, said second predetermined time duration T3 commencing upon the termination of said first predetermined time duration T2, said temporary inhibit means temporarily inhibiting the development of said relay output signal until said output circuit means has received said first discrete level output signal and a second discrete level output signal occurring during the second predetermined time period T3, whereby the occurrence of said first and said second discrete level output signals manifest that the magnitude of the current in the a-c power line has exceeded said predetermined limit.

2. A static instantaneous overcurrent relay in accordance with claim 1 and in which said level detector circuit means includes intermediate signal processing means for fixing the time duration of each of said level detector output signals for a predetermined time period T1 following the initiation of each of said plurality of level detector output signals.

3. A static instantaneous overcurrent relay in accordance with claim 2 in which said temporary inhibit means comprises:
   (a) delay circuit means for receiving said discrete level detector output signals and developing a delayed signal, said delayed signal commencing after said predetermined delay period T2 after the occurrence of said first discrete level detector output signals and before the development of said second discrete level detector output signal, said delayed signal having said predetermined time duration T3, and
   (b) AND circuit means for receiving said delayed signal and a non-delayed discrete level detector output signal, said AND circuit means developing said relay output signal when said delayed signal and said non-delayed signal are substantially coincident.

4. A static instantaneous overcurrent relay in accordance with claim 3 in which the sum of said time periods T1 and T2 is less than 8 ms and said predetermined time duration T3 is greater than or equal to 20 ms.

5. A static instantaneous overcurrent relay in accordance with claim 4 for a 50-60 hertz power system in which said predetermined time period T1 is from about 1 ms to about 7 ms and said predetermined time duration T3 is about 25 ms.

6. A static instantaneous overcurrent relay in accordance with claim 5 in which said relay has a transient overreach percentage of less than 10% for line angles up to 75°.

7. A static instantaneous overcurrent relay in accordance with claim 6 which includes seal-in circuit means for causing said relay output signal to continue for a predetermined time after its initiation.

8. A static instantaneous overcurrent relay in accordance with claim 7 in which output circuit means includes temporary inhibit bypass means for bypassing said temporary inhibit means when the magnitude of the current in the a-c power line reaches a value significantly greater than said predetermined limit.

9. A static instantaneous overcurrent relay in accordance with claim 8 in which said output circuit means includes temporary inhibit means for temporarily inhibiting the development of said relay output signal for a predetermined time period.

10. A static instantaneous overcurrent relay in accordance with claim 9 for a three phase power system in which the input signal is representative of the magnitude of current in the three phases wherein said predetermined time period T1 is of a value such that said relay output signal is developed no sooner than after said output circuit means receives said two of said discrete level detector output signals for one of said phases and wherein said second discrete level detector output signal may be provided by one of the other two phases.

11. A static instantaneous overcurrent relay in accordance with claim 10 for a 50-60 hertz system in which said predetermined time period T1 is 7 ms.

12. A static instantaneous overcurrent relay in accordance with claim 2 in which said input signal is in the form of a voltage signal and in which said level detector circuit means includes a voltage comparator.

13. A static instantaneous overcurrent relay in accordance with claim 12 in which said level detector circuit means includes a multivibrator for determining said predetermined time period T1.

14. A static instantaneous overcurrent relay in accordance with claim 12 in which said delay circuit means includes a multi-vibrator for determining said predetermined time duration T3.

15. A static instantaneous overcurrent relay with reduced transient overreach for use in protecting an a-c power line from overcurrents wherein the relay receives an input signal representative of the magnitude of the current in the a-c power line and develops a relay output signal when the magnitude of the current in the a-c power line reaches a predetermined magnitude, which comprises:
   (a) level detector circuit means for receiving the input signal representative of the magnitude of current in the a-c power line, said input signal being in the form of a pulsating waveform having substantially twice the frequency as the frequency of the a-c power line, said pulsating waveform comprising a plurality of discrete pulses, said level detector circuit means developing a discrete level detector output signal in response to each one of said discrete pulses of said pulsating waveform which attains a magnitude representative of the predetermined magnitude of the current in the a-c power line; said level detector circuit means includes intermediate signal processing means for fixing the time duration of each of said level detector output signals for a predetermined time period T1 following the initiation of each of said level detector output signals, and;
   (b) output circuit means coupled to receive said discrete level detector output signals, said output circuit including a temporary inhibit means for temporarily inhibiting the development of said relay output signal until said output circuit has received two of said discrete level detector output signals representative of the predetermined magnitude; said temporary inhibit means comprises:
   1. delay circuit means for receiving said discrete level detector output signals and developing a delayed signal, said delayed signal commencing after a predetermined delay period T2 after the occurrence of one of said discrete level detector output signals and before the development of the next discrete level detector output signal, said delayed signal having a predetermined time duration T3, and
   2. AND circuit means for receiving said delayed signal and a non-delayed discrete level detector output signal, said AND circuit means developing said relay output signal when said delayed signal and said non-delayed signal are substantially coincident.

16. A static instantaneous overcurrent relay in accordance with claim 15 in which the sum of said time periods T1 and T2 is less than 8 ms and said predetermined time duration T3 is greater than or equal to 20 ms.

17. A static instantaneous overcurrent relay in accordance with claim 16 for a 50-60 hertz power system in which said predetermined time period T1 is from about 1 ms to about 7 ms and said predetermined time duration T3 is about 25 ms.

18. A static instantaneous overcurrent relay in accordance with claim 16 in which said relay has a transient overreach percentage of less than 10% for line angles up to 75°.

19. A static instantaneous overcurrent relay in accordance with claim 15 which includes seal-in circuit means for causing said relay output signal to continue for a predetermined time after its initiation.

20. A static instantaneous overcurrent relay in accordance with claim 15 in which output circuit means includes temporary inhibit bypass means for bypassing said temporary inhibit means when the magnitude of the current in the a-c power line reaches a value significantly greater than said predetermined magnitude.

21. A static instantaneous overcurrent relay in accordance with claim 15 in which said output circuit means includes temporary inhibit means for temporarily inhibiting the development of said relay output signal for a predetermined time period.

22. A static instantaneous overcurrent relay in accordance with claim 15 for a three phase power system in which the input signal is representative of the magnitude of current in the three phases wherein said predetermined time period T1 is of a value such that said relay output signal is developed no sooner than after said output circuit means receives said two of said discrete level detector output signals for one of said phases and wherein said second discrete level detector output signal may be provided by one of the other two phases.

23. A static instantaneous overcurrent relay in accordance with claim 22 for a 50-60 hertz system in which said predetermined time period T1 is 7 ms.

24. A static instantaneous overcurrent relay in accordance with claim 15 in which said input signal is in the form of a voltage signal and in which said level detector circuit means includes a voltage comparator.

25. A static instantaneous overcurrent relay in accordance with claim 24 in which said level detector circuit means includes a multivibrator for determining said predetermined time period T1.

26. A static instantaneous overcurrent relay in accordance with claim 24 in which said delay circuit means includes a multivibrator for determining said predetermined time duration T3.

* * * * *